J. H. LEVIS.
CATTLE STANCHION.
APPLICATION FILED FEB. 24, 1913.
1,152,523.
Patented Sept. 7, 1915.
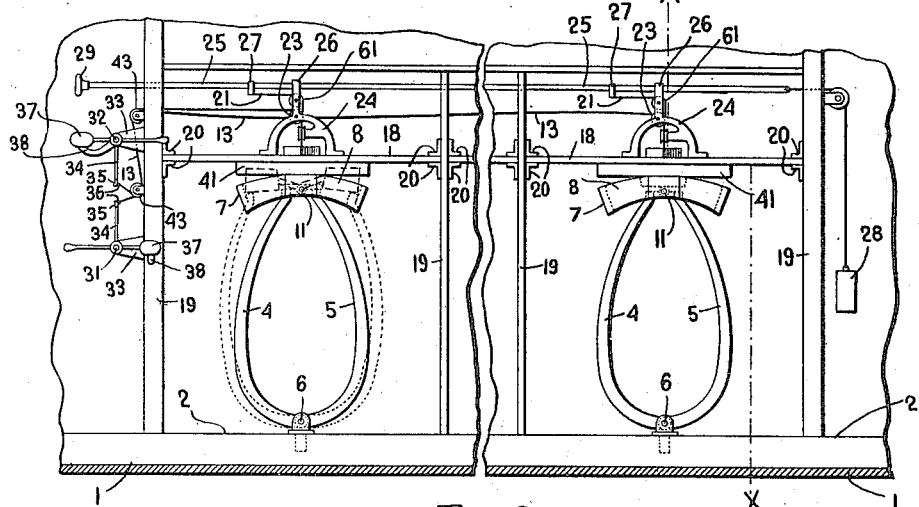
Fig. 1.
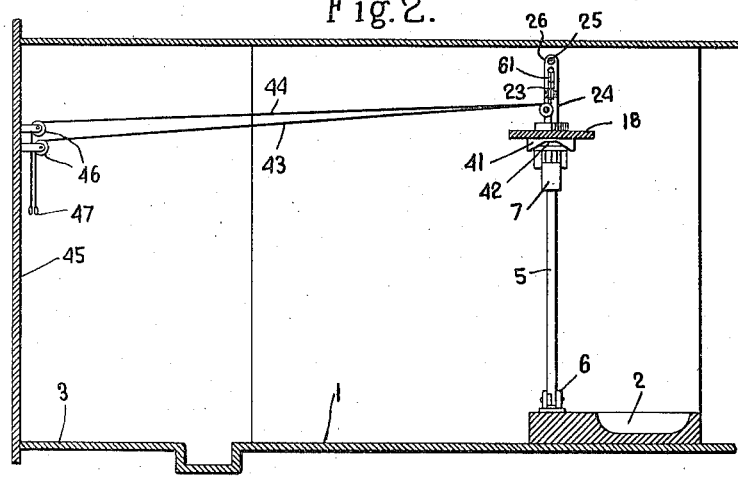
Fig. 2.
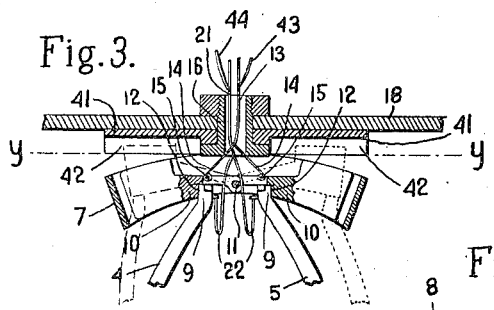
Fig. 3.
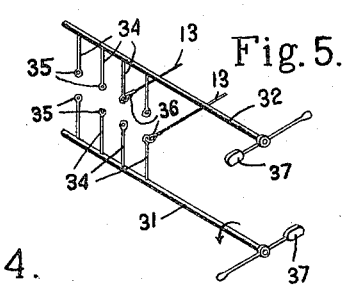
Fig. 5.
Fig. 4.
Witnesses.
Thomas J. Drummond
Joseph D. Ashe
Inventor.
James H Levis,
by Edwards, Hand & Smith
Atty's.

UNITED STATES PATENT OFFICE.

JAMES H. LEVIS, OF IPSWICH, MASSACHUSETTS.

CATTLE-STANCHION.

1,152,523.

Specification of Letters Patent.

Patented Sept. 7, 1915.

Application filed February 24, 1913. Serial No. 750,109.

*To all whom it may concern:*

Be it known that I, JAMES H. LEVIS, a citizen of the United States, residing at Ipswich, county of Essex, State of Massachusetts, have invented an Improvement in Cattle-Stanchions, of which the following description, in connection with the accompanying drawing, is a specification, like characters on the drawing representing like parts.

This invention relates to cattle stanchions and it has for its object to provide a novel swinging stanchion which can be easily opened or closed at a point remote from the stanchion; to provide a construction whereby when any stanchion is opened it will be automatically centered and held in centered position until it is closed; and to provide a novel mechanism by which any desired number or any particular stanchions of a plurality of stanchions in a stable can be opened simultaneously.

The features wherein my invention resides will be more fully hereinafter described and then pointed out in the appended claims.

In the drawings wherein I have illustrated the preferred embodiment of my invention, Figure 1 shows a portion of a stable having my improved stanchions therein, the stanchions being shown in elevation; Fig. 2 is a section on the line $x$—$x$, Fig. 1; Fig. 3 is an enlarged sectional view through the head portion of a stanchion; Fig. 4 is a section on the line $y$—$y$, Fig. 3; Fig. 5 is a fragmentary view of the selective device by which any particular stanchion can be operated from a central point.

1 designates a stable floor, 2 the manger and 3 the platform or walk behind the cattle.

My improved stanchion comprises two stanchion members 4 and 5 which are pivoted at their lower ends, as at 6, so as to permit them to be moved toward and from each other, as shown by the full and dotted lines Fig. 1, and a head 7 situated at the top of the stanchion and which forms a guide for the upper ends of the stanchion members and is provided with latches to engage said upper ends to lock the stanchion closed. In the preferred embodiment of my invention the head 7 is formed with two connected side pieces 8 thereby forming a sort of hollow frame, and the upper ends 9 of the stanchion members 4 and 5 are received within said frame between the side pieces 8.

10 designate latches which are pivoted within the frame and are adapted to engage the upper ends 9 of the stanchion member. As herein shown these two latches are oppositely disposed and both are pivoted to the same pintle-pin 11 which is carried by the frame 7. Each latch has a shoulder 12 which is adapted to engage the upper end 9 of a stanchion member thereby to lock the stanchion member closed, as clearly seen in Fig. 3. The latches extend some distance beyond the shoulder 12 and the overhanging portion thereof is of sufficient weight to hold the latch positively in locking engagement with the stanchion members. To open the stanchion members the weights are lifted to disengage the shoulders 12 from the upper ends 9 of said members, and as soon as this is done the stanchion members will swing outwardly by gravity and open automatically. This is due to the fact that the stanchion members are bow-shaped and the center of gravity of each stanchion member is considerably outside of the pivotal point 6.

For supporting the head 7 I have provided the latter with a neck portion 16 which is herein shown as hollow or tubular for reasons hereinafter described, and which neck is sustained in a supporting plate 18 that is secured to the standards 19. The supporting plate 18 will be removably secured to the standards 19, and this can conveniently be provided for by forming the standards with guiding brackets 20 between which the edges of the plate 18 are received. The supporting plate 18 can be bolted, screwed or otherwise fastened to the brackets to prevent it from being withdrawn when in use.

In order to provide for unlocking the latches from a point remote from the stanchion, I propose to employ a cord or flexible connection 13 which is provided with the two branches 14 that are connected to the two latches 10 at 15 so that an upward pull on the cord 13 will lift the latches and free the shoulders 12 thereof from the stanchion members 4 and 5. The cord 13 passes up through the hollow neck 16 and may be led to any point remote from the stanchions at which it is desirable to operate the stanchions.

An upward pull on the cord 13 will release the latches 10 from the stanchion members, as will be obvious, and the stanchion members will then automatically open out into the dotted line position Fig. 1 by the action of gravity.

For closing the stanchion member I provide a stanchion-closing cord 21 which extends down through the hollow neck 16 and is provided with the two branches 22 that lead to and are connected with the upper ends of the stanchion members 4 and 5, respectively. When the stanchion is open these branches 22 are in substantially a straight line, as shown by dotted lines Fig. 3, and when the parts are in this position, an upward pull on the stanchion-closing cord 21 will draw the stanchion members together. As soon as the stanchion members pass inside of the shoulders 12, the gravity-actuated latches 10 will automatically lock the stanchion closed.

Each of the stanchions has the construction above described and the stanchion-opening and stanchion-closing cords 13 and 21 for each stanchion are arranged so that they can be manipulated from the same point. In the embodiment of the invention herein shown I have provided an arrangement whereby all or any one of the stanchions can be operated from the end of the stable, and for this purpose the stanchion-opening cord 13 for each stanchion is led up over a direction pulley 23 that is sustained in a suitable bracket 24 secured to the supporting plate 18 and said cords are then led to the end of the stable. The stanchion-closing cord 21 for each stanchion is led up over a direction pulley 61 that may be carried by the proper bracket 24 and then is secured to a stanchion-closing member 25 in the form of a rod or bar that extends the length of the stable and is mounted for longitudinal movement in suitable bearings 26. Each of the stanchion-closing cords 21 is connected to the stanchion-closing bar, as at 27, so that a movement of the bar to the left Fig. 1 will operate to close all the stanchions that are open. This stanchion-closing bar is preferably provided with automatically-operated means for keeping the bar to the right-hand end of its movement or in the position shown in Fig. 1, and as herein shown I have provided a counterweight 28 for this purpose. The left-hand end of said bar is provided with a knob or handle 29 by which the bar can be drawn forwardly to close the stanchions.

By leading all the stanchion-opening cords 13 to the space 30 at the left-hand end of the stable in Fig. 1, it is possible by selecting the proper cord and drawing thereon to open any desired stanchion. In order to facilitate the opening of several stanchions at one time I have provided a selective device by which any desired stanchions can be selected and operated independently of the other stanchions. One form of this selective device is shown in Figs. 1 and 5, and it comprises two rock shafts 31 and 32 suitably journaled in brackets 33, and each provided with a plurality of fingers 34 having eyes 35 at their ends. The stanchion-closing cords 13 are led around direction pulleys 43 and each cord has secured thereto a snap hook 36 or some other other fastening device which can be fastened into the eyes 35 on either rock-shaft. By turning the rock shafts in the direction of the arrows in Fig. 5 the movement of the fingers 34 will draw forwardly on the cords 13 attached to the fingers and by this means the stanchions can be unlocked and opened.

Assuming that the stable has twenty stalls and twenty stanchions, then I will preferably provide each of the rock-shafts 31, 32 with twenty fingers 34, and each of the stanchion-closing cords will be numbered to correspond with the number of the stanchion or stall. If now it is desired to release at any one time the cattle in stalls number 3, 5, 7, 8, 9, 14, 15 and 18, the corresponding stanchion-opening cords 13 will be connected to the eye 35 on the rock-shaft 31, while the cords of the other stanchions will be connected to the fingers of the rock-shaft 32. After this has been done the rock-shaft 31 will be turned in the direction of the arrow in Fig. 5 thereby drawing on all of the above-mentioned cords and opening all of the corresponding stanchions simultaneously. After any stanchion is open and the pull on the corresponding stanchion-opening cord 13 has been relieved the gravity-actuated latches 10 are allowed to rest on the upper ends of the stanchion members, and said latches thus operate to assist in holding the stanchion open. This construction by which any desired number and any particular stanchions can be opened simultaneously is an important feature because in caring for a large number of cattle the herdsman usually wishes to release different groups of cattle at different times and my invention enables him to accomplish this without the necessity of walking the length of the stable to release the cattle individually.

I preferably provide the rock shafts 31, 32 with the weighted arms 37 which operate automatically to hold the shafts in the positions shown in Figs. 1 and 5. 38 are stops which engage the arms and limit the turning movement in one direction.

My invention can be embodied in either swinging or stationary stanchions. The stanchions herein shown are swinging stanchions, and the swinging movement is provided for by mounting the necks 13 of the heads in the supporting plates 18 so as to allow the heads to turn about a vertical axis and by pivoting the lower ends of the stanchion members 4, 5 of each stanchion to an anchoring member 39 which is mounted to turn in the floor of the stall. By reason of the fact that the cords 13 and 21 extend up through the hollow neck it will be seen that the stanchions can be opened or closed regardless of their position. It is, however, desirable that when the stanchions are opened they should always be placed square across the stall so that when the animal enters the stall the stanchion will be in the proper place for it to insert its head therein. I have, therefore, provided means whereby when the stanchions are opened they will be held in their centered position. As herein shown the latches have at their upper sides the beveled faces 40 to provide the V-shaped formation and the supporting plates 18 have on their under side centering members 41 having the V-shaped grooves 42 in their under sides. When the latches 10 are elevated to release the stanchions the inclined faces 40 thereof enter into the V-shaped grooves 42 and the engagement of the latches in the grooves locks the head from turning. By making the grooves and the latches 10 with inclined faces any head 7 will center itself as the latches 10 are raised, provided said head is swung slightly out of its position at the time the stanchion is opened.

It is convenient oftentimes to be able to release any individual animal without going to the space 30, and to provide for this I connect to each of the cords 13 and 21 auxiliary stanchion-releasing and stanchion-closing cords 43 and 44, these auxiliary cords extending back over the animal to the rear wall 45 of the stable and passing over direction pulleys 46. The cords have at their lower ends hand pulls 47 so that a person walking along the walk or platform 3 behind the cattle can release any individual animal by manipulating the proper cord 43.

It will be noted that each bracket 24 is carried by a supporting plate 18. The advantage of this construction is that it facilitates the placing of my improved stanchions in any stable. This can be done by simply pivoting stanchion members at their lower end to the manger and then inserting a supporting plate 18, having the head 7 and bracket 24 secured thereto in proper position above the manger. This supporting plate with the head and bracket can be readily placed in any stable by simply providing appropriate means for securing the plate in place.

While I have illustrated the preferred embodiment of my invention, I do not wish to be limited to the construction of details shown.

Having fully described my invention, what I claim as new and desire to secure by Letters Patent is:—

1. In a stanchion, the combination with two stanchion members pivotally connected at their lower ends and capable of swinging toward and from each other, of a head embracing the movable upper ends of said members, latches carried by said head for locking the stanchion members in closed relation, said latches resting on and being supported in inoperative position by the stanchion members when the latter are opened, means supporting said stanchion members for turning movement about a vertical axis, and means coöperating with said latches when they are in inoperative position to hold the stanchion centered.

2. In a stanchion, the combination with two stanchion members pivotally connected at their lower ends and capable of swinging toward and from each other, of a head embracing the movable upper ends of said members, gravity-actuated latches carried by said head for locking the stanchion members in closed relation, said latches resting on and being supported in inoperative position by the stanchion members when the latter are opened, means supporting the stanchion members for turning movement about a vertical axis, and means coöperating with said latches when they are in their in inoperative position to hold the stanchions centered.

3. In a stanchion, the combination with two stanchion members pivotally connected at their lower ends and capable of swinging toward and from each other, of a head embracing the upper movable ends of said members and having a hollow neck, latches carried by said head for locking the stanchion members in closed relation, cords connected to said latches and extending through said hollow neck by which the latches can be raised, said latches resting on and being supported in inoperative position by the stanchion members when they are opened, means sustaining said head for turning movement about a vertical axis and means to engage said latches when raised and hold the stanchion from turning.

4. In a stanchion, the combination with two stanchion members pivotally connected at their lower ends and capable of moving toward and from each other, of a supporting member a head having a hollow neck mounted for turning movement in said member, weighted latches pivoted at their inner ends to said head and each having provision between its pivot and its weighted end to engage said stanchion member and hold it closed, said latches being held in raised position by the stanchion members when they are open, a cord connected to said latches by which they may be released from the stanchion members and means to engage the latches when raised to hold the stanchions centered.

5. The combination with a plurality of stanchions, of a stanchion-opening cord for each stanchion, said cords all extending to the same place, a movable selective device, means for detachably connecting any particular cord or cords to said selective device, and means for operating said selective device thereby to open the stanchions corresponding to said cords.

6. The combination with a plurality of stanchions, of a stanchion-opening cord for each stanchion, said cords all leading to the same location, a rock-shaft having a plurality of arms, means for detachably connecting any selected cords to said arms, and means for operating said shaft whereby the stanchions corresponding to said selected cords may be opened simultaneously.

7. The combination with a plurality of stanchions, each comprising two pivotally-connected stanchion members, and a head, of latches carried by the heads for holding the stanchions closed, a stanchion-opening cord connected to the latches for each stanchion and by which the latches are released, a stanchion-closing member, and a stanchion-closing cord for each stanchion connected to said member and connected to the upper ends of the stanchion members.

8. In a stanchion, the combination with two stanchion members pivotally connected at their lower ends, of a head embracing the upper movable ends of said members, latches carried by said head for locking the stanchion members in closed relation, said head being mounted for turning movement about a vertical axis, means for releasing the latches, said latches resting on and being held in inoperative position by the stanchion members when the latter are opened, and means coöperating with the latches for locking the head from turning movement when the latches are released.

9. In a stanchion, the combination with two stanchion members pivotally connected at their lower ends, of a head embracing the upper movable ends of said members, latches carried by said head for locking the stanchion members in closed relation, said head being mounted for turning movement about a vertical axis, means for raising the latches to release them, said latches resting on and being held in inoperative position by the stanchion members when the latter are opened, a centering member associated with the head and having interlocking engagement with the latches when they are raised whereby to hold the head from turning while the stanchion is open.

10. In a stanchion, the combination with a plurality of stanchions, each comprising two pivotally-connected stanchion members, of gravity-actuated latches for locking the stanchion members of each stanchion closed, a stanchion-opening cord connected to the latches for each stanchion, said cords all leading to a central point from which they may be operated, a stanchion-closing cord connected to the members of each stanchion for closing the latter, and an auxiliary stanchion-opening cord and an auxiliary stanchion-closing cord connected to the first-named cords and leading to a point behind the stanchion.

In testimony whereof, I have signed my name to this specification, in the presence of two subscribing witnesses.

JAMES H. LEVIS.

Witnesses:
BERTHA F. HEUSER,
LOUIS C. SMITH.